July 23, 1968     T. B. SAUNDERS     3,393,431

PLASTIC FASTENING DEVICE

Filed June 16, 1967     2 Sheets-Sheet 1

INVENTOR.
THOMAS B. SAUNDERS.
BY
WILSON, SETTLE & BATCHELDER.
ATT'YS.

July 23, 1968    T. B. SAUNDERS    3,393,431
PLASTIC FASTENING DEVICE
Filed June 16, 1967    2 Sheets-Sheet 2
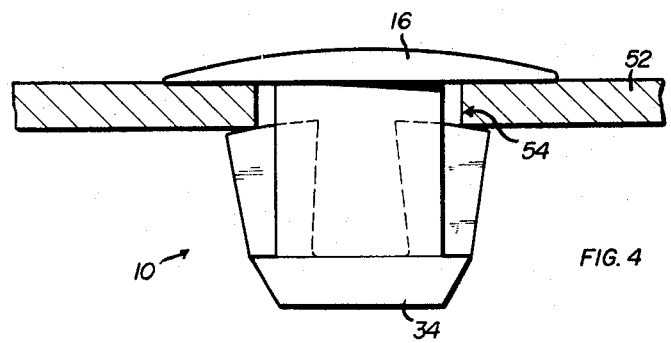
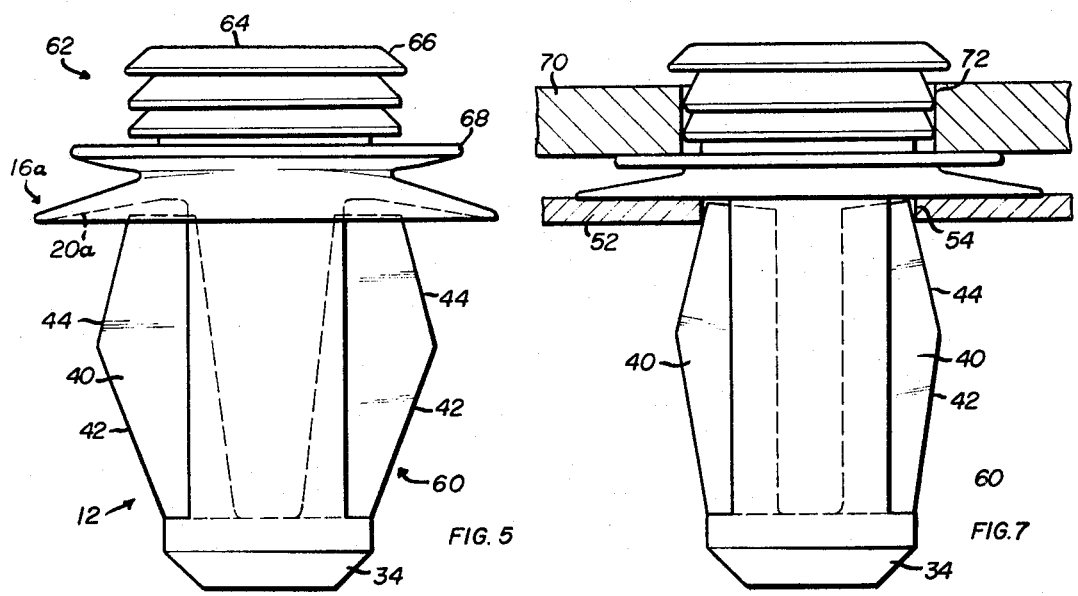
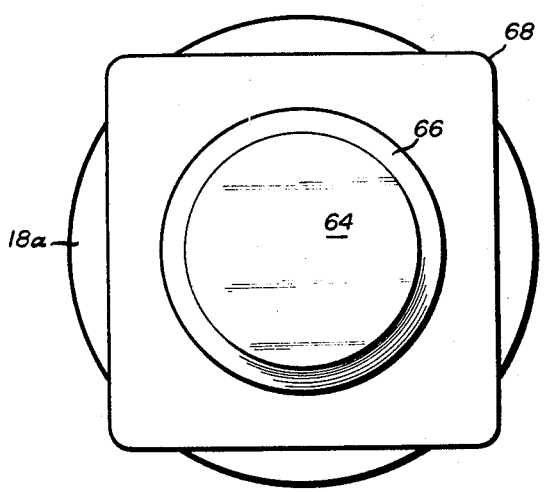
INVENTOR.
THOMAS B. SAUNDERS.
BY
WILSON, SETTLE & BATCHELDER.
ATT'YS.

United States Patent Office 3,393,431
Patented July 23, 1968

3,393,431
PLASTIC FASTENING DEVICE
Thomas B. Saunders, St. Clair Shores, Mich., assignor to Robin Products Company, Warren, Mich., a corporation of Michigan
Filed June 16, 1967, Ser. No. 646,591
1 Claim. (Cl. 24—73)

ABSTRACT OF THE DISCLOSURE

A plug or fastening device having a locking portion for securing it to an apertured support structure. The device is an integral molded plastic member having flexible locking legs that are offset on opposite sides of a common plane and located in a slot formed in the plug so that the member can readily be molded in a single operation.

Background of the invention

The present invention relates generally to fastening devices and more particularly to locking means for securing a fastening device in the aperture of a support structure.

The recent trend in the automotive industry, as well as various other industries, has been to form the majority of the fastening devices of a plastic material to eliminate any rusting problems which heretofore were very common in the metal fasteners that had been used for many years. In the construction of these fastening devices, it has been customary to provide opposed locking legs that have locking surfaces adjacent the upper edges thereof which engage the lower surface of an apertured support for locking the fastening device to the support.

In production of these plastic fasteners, it has been found that producing a mold of the desired configuration for the fastening device and thereafter injecting plastic material into the mold is the most efficient manner of manufacturing plastic fastening devices.

One of the problems encountered in production of one piece fastening devices is that the manufacture of an integral molded device in a single step was difficult to accomplish. Thus, difficulties were encountered in properly configuring a fastening device which could readily be molded in a single operation.

Summary of the invention

According to the invention, a plug or fastening device is specifically shaped and configured so that it can readily be molded in a single operation. This is accomplished by providing a fastening device having locking means which includes a shank portion that is capable of extending in a support structure with a slot or opening extending across the axis of the shank portion. The shank has a pair of integral deflectable legs which are integrally formed with the lower edge of the slot and the major portion of each leg is disposed in the slot. The legs are offset on opposite sides of a plane parallel to the axis of the shank. The device further includes a sealing flange adjacent the upper end of the shank which engages a surface of the support structure to seal the aperture in the support structure.

Thus, the primary object of the present invention is to provide a molded fastening device which is capable of being produced in a single operation.

Another object is to provide a fastening device which can be produced with considerably less tooling than has heretofore been known for plastic fastening devices.

A still further object of the present invention is to provide a fastening device which has locking legs offset on opposite sides of a common plane so that the device can be molded in a single operation.

Figure 1:
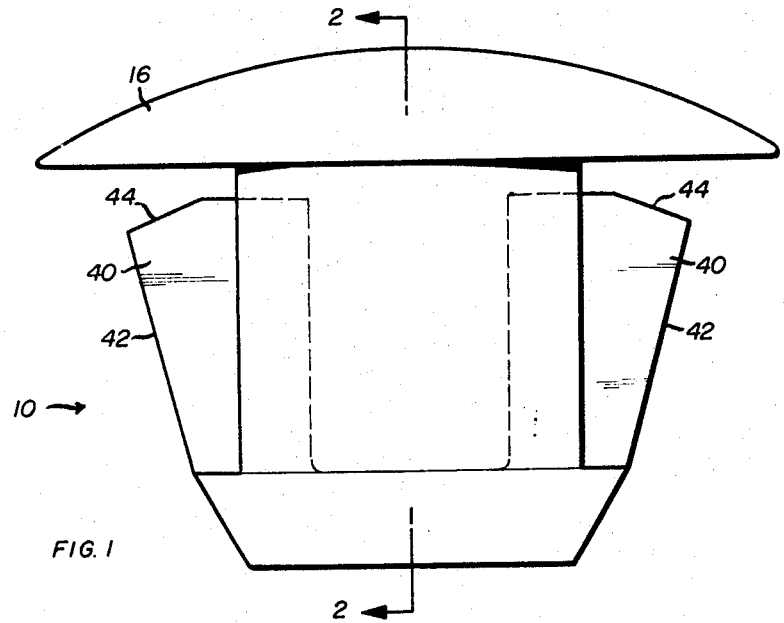
Figure 2:
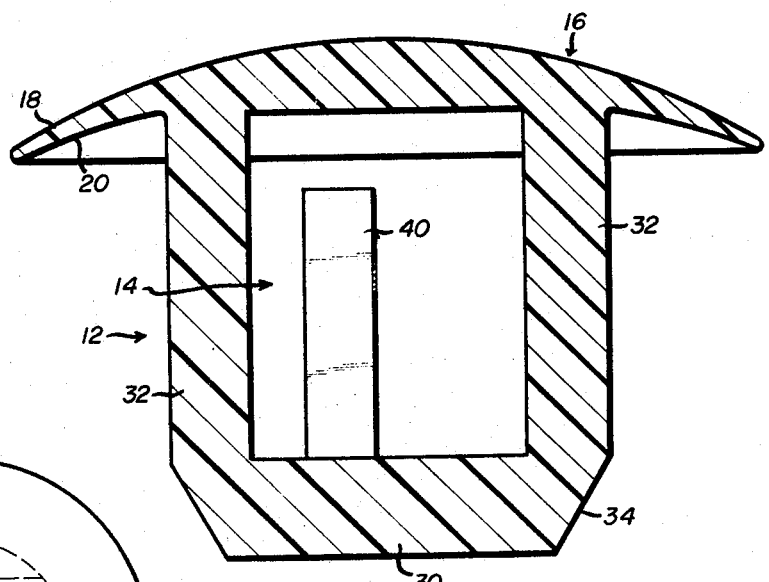
Figure 3:
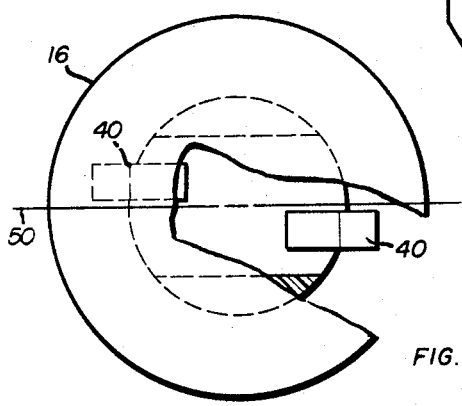

Other objects and advantages of the invention will more fully appear from the following description taken in connection with the accompanying drawings, wherein:

FIGURE 1 is an enlarged side elevational view of the fastening device of the present invention;
FIGURE 2 is a vertical sectional view taken along lines 2—2 of FIGURE 1;
FIGURE 3 is a top plan view of the device shown in FIGURE 1, with parts broken away;
FIGURE 4 shows the fastening device in its installed position in the aperture of a support panel;
FIGURE 5 is a slightly modified fastening device which includes means for attaching a panel thereto;
FIGURE 6 is a top plan view of the fastener shown in FIGURE 5; and
FIGURE 7 is a side elevational view showing the fastening device of FIGURE 5 in its installed position.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIGURES 1 to 3 of the drawings show the fastening device of the present invention, generally designated at 10, in the form of a plug. The fastening device 10 includes a substantially circular shank 12 having an elongated slot 14 extending transversely thereof to define an enlarged opening extending across the axis of the shank 12. The shank has an integral head 16 at the upper end thereof which has an outwardly directed flange 18. The flange 18 has a lower arcuate surface 20 extending beyond the edge of the shank which defines a sealing surface, that will be described in more detail hereinafter.

As more clearly shown in FIGURE 2, the slot 14 in the shank 12 defines a substantially U-shaped portion with the bite portion forming a base 30 and the legs of the U-shaped portion defining upstanding members 32 which are integral with the lower surface of the head 16. The lower end of the shank 12 or more particularly the base 30 has pilot means in the form of a tapered wall or edge 34 for guiding the shank portion through an aperture, in a manner to be described later.

The base 30 has a pair of integral, upwardly-directed polygonal legs 40 the major portion of each being located within the peripheral edge of the shank 12. Each leg 40 has a pair of camming surfaces 42, 44 extending beyond the peripheral surface of the shank 12 with the surface 42 being upwardly-outwardly inclined and surface 44 being inwardly-upwardly inclined and adapted to engage a surface of the support, in a manner to be described later.

As more clearly shown in FIGURES 2 and 3 the legs 40 are offset on opposite sides of a common vertical plane 50 which includes the longitudinal axis of the shank 12. By locating the legs 42 on opposite sides of a common plane, the entire plug can readily be molded in a single operation. More particularly, the offset legs will allow portions of the mold sections to extend into the opposite ends of the slot so that the entire plug can readily be molded in a single step. Furthermore, the location of the legs will greatly decrease the amount of tooling required in the production of the plugs.

FIGURE 4 shows the fastening device or plug in its installed position in an aperture 54 of a support structure 52. During insertion of the plug 10 into the aperture 54 in the support 52, the tapered end 34 of the shank 12 guides the shank portion into proper position in the aperture 54. As the shank is being received into the aperture 54, the legs 40 will be flexed inwardly by the camming surfaces 42 engaging the wall of the aperture. During insertion of the shank 12 through the aperture 54, the flange 18 will engage the top surface of the support and the arcuate or concave lower surface of the head 16 will be flattened by engagement with the surface of the support. In its final installed position, the plug will be locked to the support by the second camming surfaces 44 of the respective legs 40 engaging the lower edge or point defined by the wall aperture and the lower surface of the support.

As can readily be appreciated from an inspection of FIGURE 4, the lower surface of the head 16 or more particularly the flange 18 defines a sealing surface for effectively sealing the aperture in the sheet metal support to prevent rusting and disintegration of the sheet metal.

A slightly modified type of fastening device is disclosed in FIGURES 5 through 7. The lower portion of the fastening device 60 shown in FIGURES 5 through 7 is substantially identical to that shown in FIGURES 1 through 4 and like reference numerals have been utilized to indicate like parts. In the fastening device 60 of FIGURES 5 through 7, the head portion 16a includes securing means 62 for securing a panel to the support structure. In the illustrated embodiment, the securing means 62 includes a rod portion 64 integral with and extending above the main portion of the head 16a. The rod portion 64 has a plurality of series of integral ribs extending outwardly therefrom and axially spaced from each other. The spaced annular ribs or rings 66 are angularly disposed relative to the peripheral surface of the rod portion 64, for a purpose to be described hereinafter.

A second annular flange 68 is located on the head portion 16a adjacent the lower end of the rod portion 64. The flange 68 is dished to define an arcuate or concave upwardly directed surface which engages one side of the panel which is to be secured to the support surface. Thus, the flange 68 is dished upwardly while the flange 20a is dished downwardly.

In the installed position, shown in FIGURE 7, the locking legs 40 are flexed inwardly as the shank portion of the fastening device 60 is forced through the aperture 54. As the camming surfaces 44 engage the lower edge of the wall defining the aperture 54, the flange 18a is flexed towards the upper end of the head so that its lower surface 20a firmly engages the surface of the support structure to provide a tight seal. Thereafter, a panel 70, having an aperture or opening 72 of slightly smaller diameter than the outer diameter of the ribs or rings 66, is properly located above the fastening device 60 and forced downwardly. As the rod portion 64 is received in the aperture 72 of the panel 70, the annular ribs or rings are deflected or flexed inwardly thereby providing a frictional engagement with the walls of the aperture in the panel.

As can readily be appreciated, the fastening device shown in FIGURES 5 through 7 provides a simple inexpensive locking device for securing two apertured panels to each other which device provides a resilient seal with a surface of each of the panels.

If desired the rod portion 64 can be increased in length and the number of ribs 66 increased so as to secure an additional panel to the upper end of the fastener. For example, in providing paneling on the inner surface of an automobile door, it is customary to first secure a hard fiber board or door trim panel onto the apertured body sheet metal of the automobile and thereafter to secure soft padding material to the door trim panel. This can readily be accomplished by the fastener shown in FIGURES 5 through 7 by providing apertures extending through the sheet metal body and through the hard fiber board or door trim panel and providing a blind hole in the padding to be supported on the fiber board. Thus, the upper end of the rod portion 64 and a few of the ribs 66 will be received in the blind hole to frictionally secure the padding to the fiber board and the fastening device also secures the fiber board to the sheet metal panel.

Although the present invention has been described in conjunction with two preferred embodiments, it is to be understood that modifications and variations may be resorted to without departing from the spirit of the invention as defined by the following claim.

I claim:

1. A molded fastening device for securing an object to an apertured support comprising a base, a pair of upstanding members on opposed edges of said base and defining a slot therebetween, a head integral with the free ends of said upstanding members, said head including a first flange having an arcuate lower surface defining a sealing surface engaging one side of said support, a pair of polygonal legs, each having one edge integral with said base and a portion disposed in said slot, said legs being located on opposite sides of a common vertical plane and each leg having two edge extending beyond the ends of said slot, said last pairs of edges defining camming surfaces engaging the wall of said aperture to bias the legs when said base is received through the aperture and locking surfaces which are forced into engagement with said support when said device is in the installed position in the aperture of the support, attaching means on said device for securing a panel having wall means defining an aperture to the support, said attaching means including an integral rod on said head above said sealing surface, said rod having a plurality of axially spaced integral rings frictionally engaging the wall means defining said aperture for attaching said panel to said support, and a second flange on said head located between said first flange and said attaching means, said second flange having an arcuate upper surface defining sealing means engaging one side of said panel adjacent said aperture.

References Cited

UNITED STATES PATENTS

| | | | |
|---|---|---|---|
| 2,896,889 | 7/1959 | Hershberger et al. | 85—5 |
| 3,115,225 | 12/1963 | Fraylick et al. | 85—5 X |
| 3,139,784 | 7/1964 | Moorman | 85—5 |
| 3,186,049 | 6/1965 | Fiddler | 24—73 |
| 3,249,973 | 5/1966 | Seckerson | 24—73 |

FOREIGN PATENTS

| | | |
|---|---|---|
| 77,904 | 4/1955 | Netherlands. |

DONALD A. GRIFFIN, *Primary Examiner.*